United States Patent [19]

Meeker

[11] 4,452,351
[45] Jun. 5, 1984

[54] SHEET HANDLING APPARATUS

[75] Inventor: James A. Meeker, Toledo, Ohio

[73] Assignee: Libbey-Owens-Ford Company, Toledo, Ohio

[21] Appl. No.: 324,376

[22] Filed: Nov. 23, 1981

[51] Int. Cl.³ .............................................. B65G 47/26
[52] U.S. Cl. .................................... 198/434; 65/273; 271/236; 271/250; 414/590
[58] Field of Search ............... 198/341, 345, 434, 375, 198/376, 379, 394, 456; 65/273, 348; 271/236, 237, 238, 241, 250, 252; 414/589, 590

[56] References Cited

U.S. PATENT DOCUMENTS 4,127,198 11/1978 Morini ................................ 198/345

Primary Examiner—Robert J. Spar
Assistant Examiner—Jonathan D. Holmes
Attorney, Agent, or Firm—Collins, Oberlin & Darr

[57] ABSTRACT

An apparatus for precisely locating a windshield at the take-off end of a conveyor for subsequent removal by a transfer apparatus. The locating apparatus includes a carriage having a lift device for raising the windshield off the conveyor up to a predetermined level. The carriage also is provided with a slide for moving the elevated windshield horizontally in a first direction against a first stop. The carriage is then actuated to move the windshield in a direction normal to the first direction against a second stop oriented 90° from the first stop.

9 Claims, 9 Drawing Figures

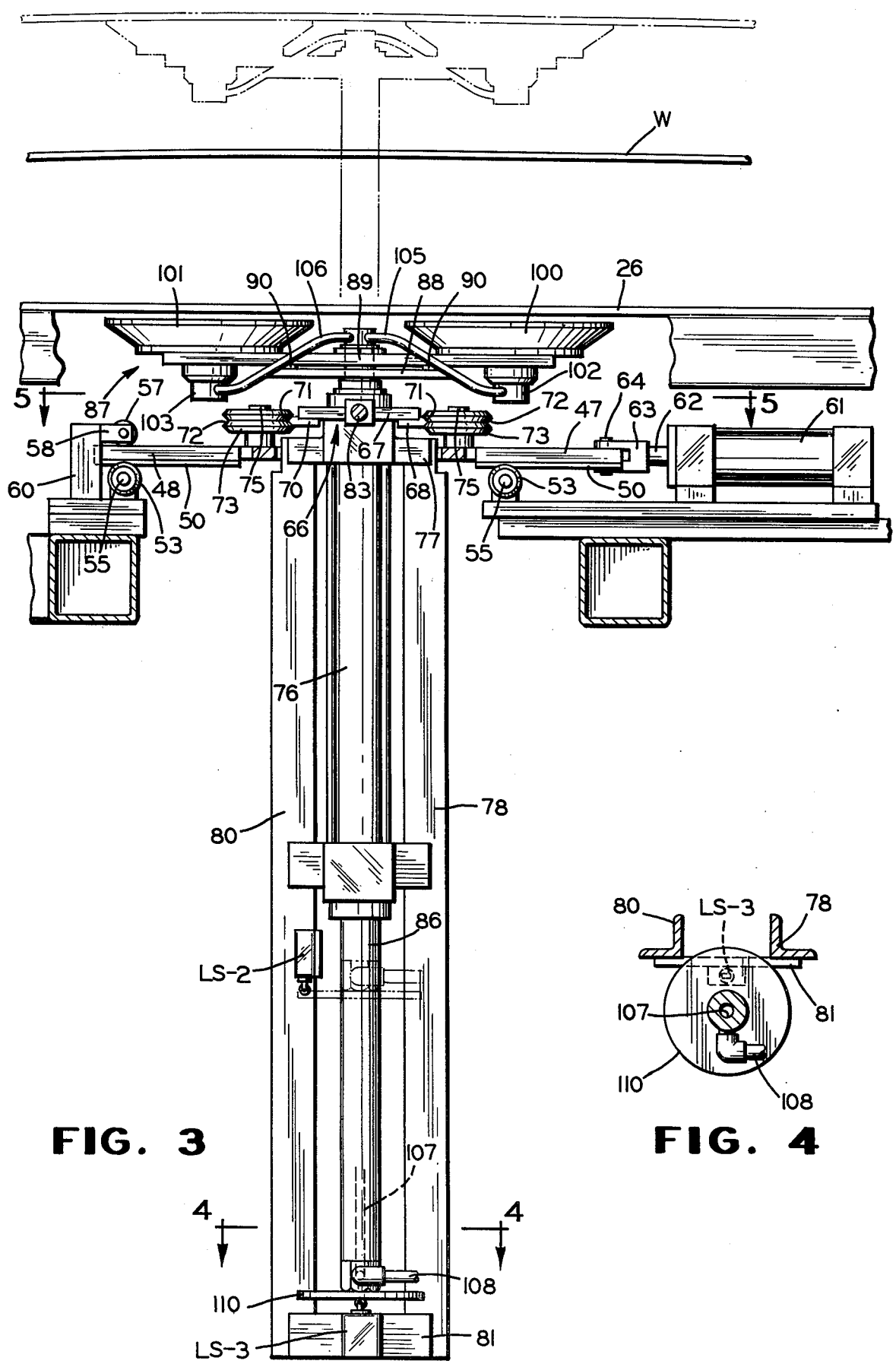

SHEET HANDLING APPARATUS

BACKGROUND OF THE INVENTION

This invention relates generally to the material handling art and, more particularly, to an apparatus for accurately positioning a laminated sheet assembly adjacent the take-off end of an assembly line for subsequent removal by a transfer apparatus.

In the mass production of glass sheet products such as automotive windshields for example, the finished product is delivered by a conveyor system to a discharge station for removal and transfer onto a portable carrier or "buck" for storage or packaging. Conventionally, the windshields are advanced one-by-one on a conveyor to a take-off section whereat the windshields are manually removed and stacked on a storage buck. However, in recent years automatic take-off devices provided with pick-up heads have been developed to remove the windshields from the take-off end of the conveyor and transfer the same to another area or buck in a stacked relation, thereby avoiding the enormous cost otherwise incurred by the manual performance of these tasks. In an automated production facility, such devices are programmed to repeatedly position the windshield gripping means in the location time after time in order to pick up the windshields from the conveyor take-off section. This, in turn, necessitates an extremely controlled and precise location of the windshield on the conveyor take-off section for the safe and speedy removal thereof by the pick-up head.

SUMMARY OF THE INVENTION

Accordingly, the primary object of the present invention is to provide a new and useful apparatus for precisely locating sheet products repeatedly in exact positions for subsequent removal by a transfer apparatus.

Another object of this invention is to provide in the foregoing apparatus means for sequentially moving the sheet product in three different directions to precisely orient the same in a predetermined position.

Another object of the present invention is to provide in the foregoing aparatus right angularly related stops against which a sheet product is moved for accurate positioning thereof.

The foregoing and other objects, advantages, and characterizing features of the present invention will become clearly apparent from the ensuing detailed description thereof, considered in conjunction with the accompanying drawings, wherein like reference characters denote like parts throughout the various views.

BRIEF DESCRIPTION OF THE DRAWINGS

FIG. 3 is a vertical sectional view, on an enlarged scale, taken along the line 3—3 of FIG. 2;

FIG. 4 is a horizontal sectional view, taken along the line 4—4 of FIG. 3;

DESCRIPTION OF THE PREFERRED EMBODIMENT

Figure 1:
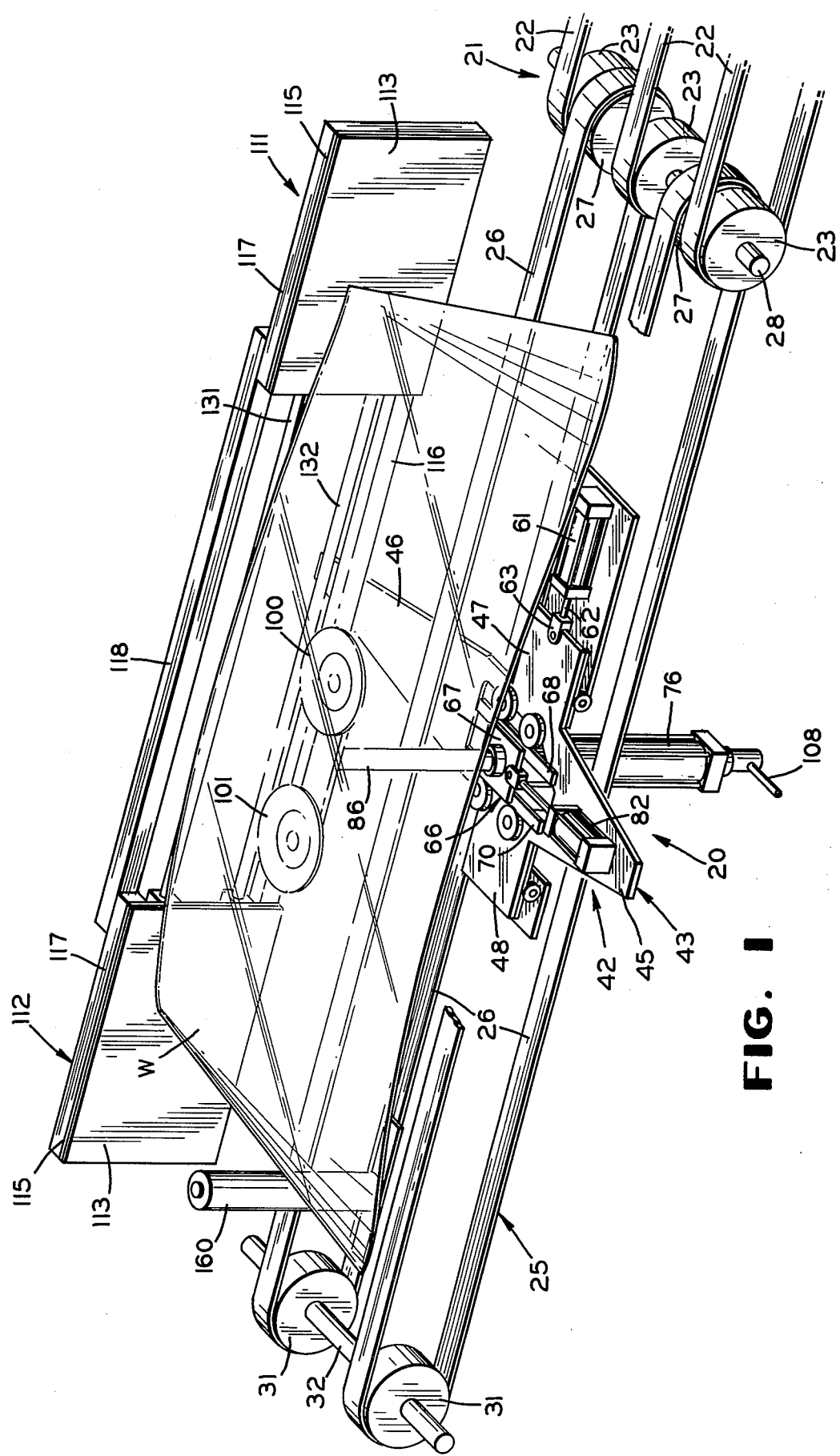
FIG. 1 is a perspective view of the sheet positioning apparatus of this invention with parts removed for the sake of clarity.

Referring now in detail to the illustrative embodiment depicted in the accompanying drawings, there is shown in FIG. 1 an apparatus, comprehensively designated 20, constructed in accordance with this invention for automatically positioning a windshield W in a precise location for subsequent removal by a programmed automated pick-up transfer head (not shown). While it will be convenient to describe the apparatus 20 of this invention in use for accurately locating a windshield because of its irregular outline, it should be understood that the apparatus 20 of this invention is in no way restricted to such usage, but has utility in a wide range of applications where it is desired to precisely position a sheet-like article for whatever purpose desired.

Figure 2:
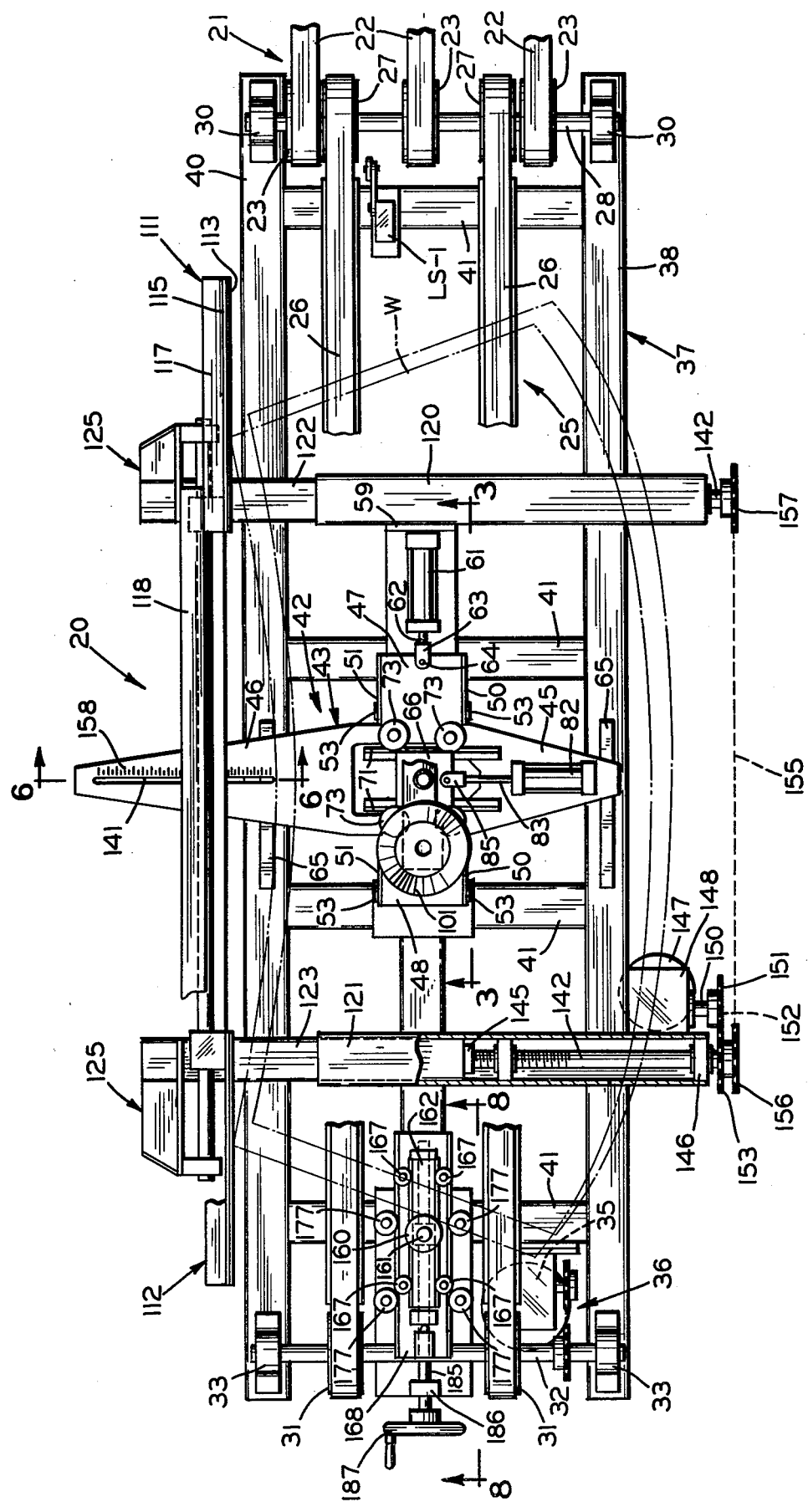
FIG. 2 is a detailed top plan view of the apparatus of FIG. 1.

The apparatus 20, which forms an integral part of a substantially continuous windshield assembly line, receives a completely assembled finished windshield W ready for packaging and shipment. As best shown in FIG. 2, the windshield W is advanced on a conveyor system 21 comprised of a plurality of laterally spaced belts 22 entrained about drive pulleys (not shown) and driven pulleys 23 and delivered to a take-off conveyor section 25. The take-off conveyor section 25 comprises a pair of laterally spaced conveyor belts 26 entrained about pulleys 27 mounted on a shaft 28 suitably journalled for rotation at the opposite ends thereof in bearing blocks 30 and about drive pulleys 31 mounted on a drive shaft 32 adjacent the forward end of the conveyor take-off section 25. For purposes of this description, the forward end of apparatus 20 will be taken as the left end as viewed in FIGS. 1 and 2. The shaft 32 is suitably journalled at its opposite ends in bearing blocks 33 and is driven by a gear-motor 35 via sprocket and chain drive arrangement 36. As the advancing windshield W is received onto the conveyor take-off section 25, the leading edge thereof trips a limit switch LS-1 for completing a suitable circuit (not shown) to energize a timing mechanism which controls the drive for conveyor belts 26. The timing mechanism is designed to deactivate the drive and thereby the belts 26 when the windshield reaches a general predetermined position on conveyor take-off section 25 to terminate movement of the latter in readiness for the final precise positioning afforded by apparatus 20.

The apparatus 20 comprises a frame 37 including a pair of laterally spaced, longitudinally extending structural members 38 and 40 and a series of transversely extending cross members 41 offering rigidity and support therefor. The longitudinal structural members 38 and 40 are supported by suitable vertical columns or posts (not shown), as is well known.

A carriage, generally designated 42, is mounted on the frame 37 for rectilinear movement relative thereto in a horizontal direction. The carriage 42 includes a slidable base plate 43 of generally cruciform configuration in plan and comprises a head portion 45, a tail portion 46 and a pair of lateral extensions 47 and 48.

Figure 5:
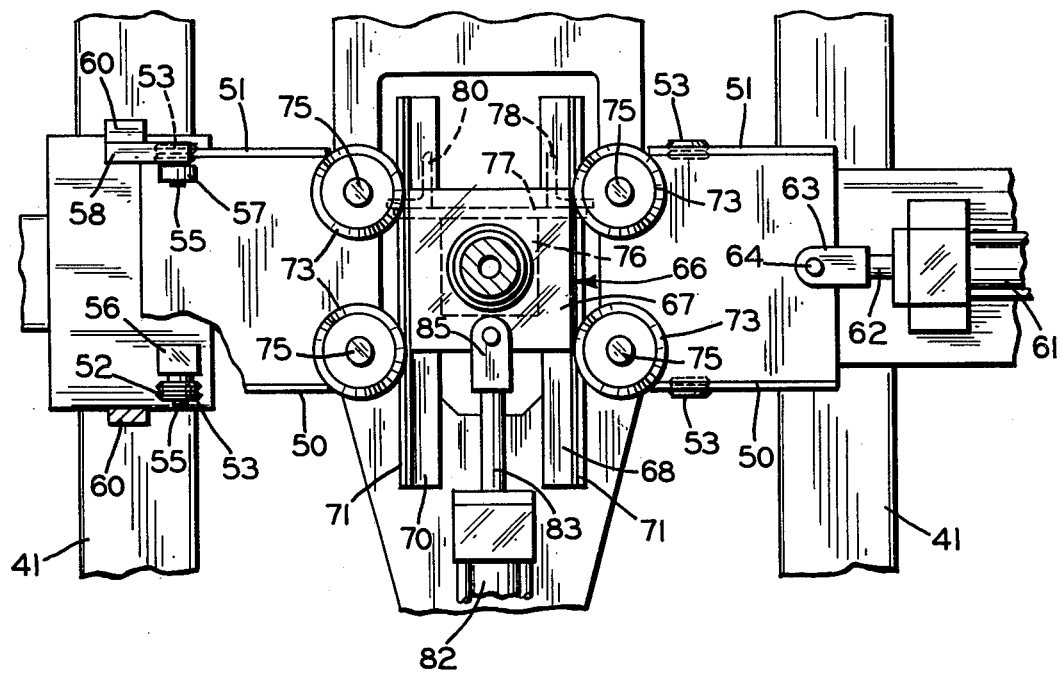
FIG. 5 is a horizontal sectional view, taken along the line 5—5 of FIG. 3.

Base plate 43 is slidable relative to frame 37 and is provided with downwardly extending dove-tailed portions 50 and 51 (FIGS. 2 and 3) along the opposite marginal edges of extensions 47 and 48 which are received and ride along complementary V-shaped grooves 52 formed in a series of support rollers 53. The rollers 53 support and guide the base plate 43 for rectilinear horizontal movement in a longitudinal or "X" direction. As shown in FIGS. 3 and 5, each roller 53 is mounted on an axle 55 secured to a mounting bracket 56 affixed to the frame 37. Also, a hold-down roller 57 is mounted on an arm 58 secured to a mounting block 60, also affixed to the frame 37. The hold-down roller 57 bears against the upper surface of the plate 43 to maintain the same in a true horizontal plane during movement thereof.

The means for reciprocating carriage 42 in the "X" direction includes a fluid cylinder 61 suitably secured to a plate 59 forming a part of frame 37 and having the usual reciprocal piston (not shown) connected to a piston rod 62. The distal end of the piston rod 62 is connected, as by lug 63 and pin 64, to the extension 47 of base plate 43. A pair of anti-friction bearing strips 65 (FIG. 2) are affixed to members 38 and 40 on the upper surfaces thereof to facilitate sliding movement of the carriage 42 thereon.

A slide 66 is mounted on the carriage 42 for movement relative thereto in a horizontal rectilinear path in a transverse of "Y" direction. The slide 66 comprises a generally flat plate 67 (FIGS. 3 and 5) having strips 68 and 70 affixed to the underface and along the sides thereof. These strips 68 and 70 are formed with dovetailed edges 71 guided within complementary V-shaped grooves 72 formed in rollers 73. These rollers 73 support the slide 66, as well as other components affixed thereto as will presently be described, and guide the slide 66 in its horizontal path of movement. As shown in FIG. 3, each roller 73 is mounted on a vertical shaft 75 affixed to and extending upwardly from the carriage base plate 43.

The slide 66 carries a fluid cylinder 76 extending downwardly therefrom and welded or otherwise fixedly secured at its upper end to the underside of plate 67. A mounting plate 77 (FIGS. 3 and 5) also is secured to one side of cylinder 76 adjacent the upper end thereof for supporting the upper ends of angle members 78 and 80. The lower ends of the angle members 78 and 80 also are affixed to a mounting plate 81. Thus, the cylinder 76, as well as the vertically extending angle members 78 and 80, are carried as a unit along with the slide 66 for movement therewith.

The means for reciprocating slide 66 includes a fluid cylinder 82 mounted on the carriage 42 and having a reciprocal piston (not shown) connected to a piston rod 83 having at its distal end a lug 85 connected to the slide 66. Thus, extension and retraction of the piston rod 83 effects reciprocal movement of the slide 66 in a "Y" direction perpendicular to the path of movement of carriage 42.

Figure 7:
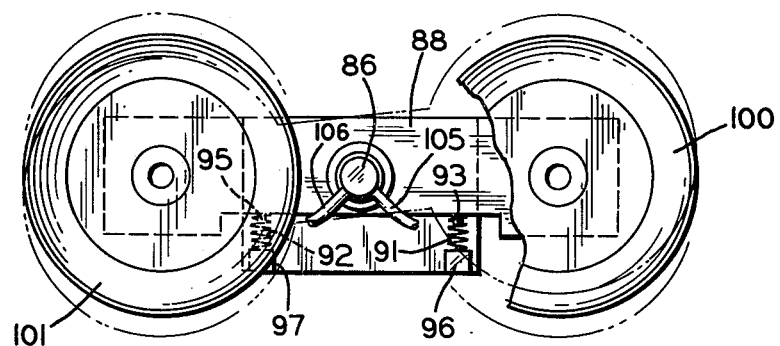
FIG. 7 is a top plan view of the suction cup grippers, showing the pivotal capability thereof.

Cylinder 76 is provided with the usual reciprocal piston (not shown) having a piston rod 86 extending outwardly from the opposite faces of the piston and projecting outwardly of both ends of cylinder 76. The upper end of the piston rod 86 is provided with a gripping head 87 comprising a base plate 88 affixed to the piston rod 86 and a mounting plate 89 overlying the base plate 88 and mounted for free pivotal movement on the rod 86. A pair of anti-friction bearing strips 90 are affixed to the base plate 88 to facilitate horizontal swinging movement of the mounting plate 89 relative to base plate 88. As best shown in FIG. 7, the plate 89 is normally disposed in the full line position depicted therein and maintained in such position by a pair of laterally spaced helical springs 91 and 92 disposed about pins 93 and 95 projecting outwardly from the inner edge of plate 88 and bearing against small blocks 96 and 97. These springs serve to return the plate 88 to its normal position after being moved as by engagement with a stop as will hereinafter be fully explained.

A pair of suction cups 100 and 101 are mounted adjacent the opposite ends of mounting plate 89 for engaging and securing or gripping a windshield thereto. These cups 100 and 101 are provided with couplings 102 and 103 for receiving vacuum hoses 105 and 106 connected at their other ends to the upper end of piston 86. The piston rod 86 is formed with a central bore or passage 107 communicating at its upper end with the vacuum hoses 105 and 106 and at its lower end to a vacuum line 108 connected to a suitable source of vacuum (not shown). The cylinder 76 is operative to raise the gripping head 87 into engagement with the central portion of an overlying windshield and lift the same off conveyor belts 26 into an upper predetermined position shown in phantom in FIG. 3. It should be noted that while the opposite end portions of the windshield rest on the conveyor belts 26, the central portion thereof is disposed substantially above the level of the conveyor belts 26 due to the pronounced curvature of the windshield. The lateral spacing between the conveyor belts 26 offers sufficient clearance for the passage of gripping head 87 therethrough. The suction force acting through cups 100 and 101 secures the windshield firmly thereto even though the latter may be slightly off-center.

The upper disposition of windshield W is determined by the upper travel of piston rod 86. Limit switch LS-2, mounted on angle member 80, is tripped by an actuator plate 110 welded or otherwise fixedly secured to the bottom end of piston rod 86. The lower travel of piston rod 86 trips limit switch LS-3 mounted on plate 81 and which is actuated by the plate 110 as it reaches the end of its downstroke. The limit switches LS-2 and LS-3 also initiate other events in the control sequence.

Figure 6:
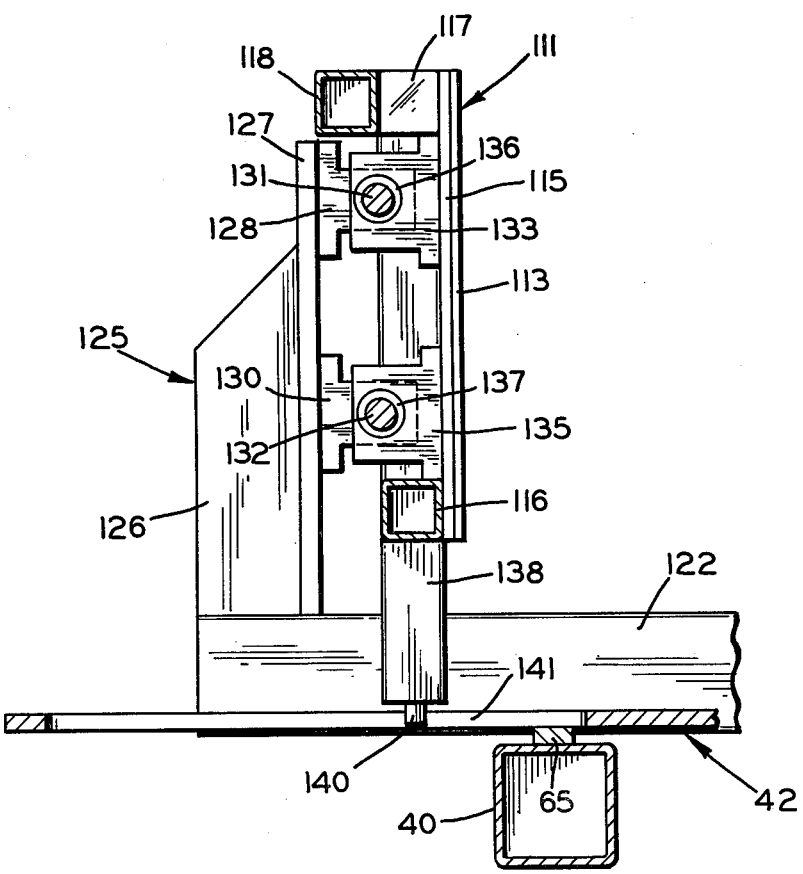
FIG. 6 is a vertical sectional view, on an enlarged scale, taken along the line 6—6 of FIG. 2.

After the cylinder 76 reaches the end of its upstroke lifting the windshield W to its upper predetermined position, cylinder 82 becomes operative to shift slide 66, along with cylinder 76, gripping head 87 and the windshield W, linearly in a horizontal path in a "Y" direction until the marginal corner edges of the windshield engage a pair of upright, longitudinally space stops 111 and 112. Each of the stops 111, 112 (FIG. 6) comprises an outer, generally rectangular sheet 113 of resiliently yieldable material to cushion the impact of the windshield corner edges thereagainst and avoid any scratching, chipping or damage thereto. Each of the sheets 113 is backed by a complementary shaped metal plate 115 rigidly secured to a lower, elongated, horizontally extending structural member 116 and, by means of a reinforcing bar 117, to an upper, elongated, horizontally extending structural member 118. Thus, the two stops 111 and 112 are connected together by means of structural members 116 and 118 and are movable as a unit in a horizontal direction as will hereinafter be described.

The means for mounting the stops 111 and 112 includes a pair of transversely extending, elongated, hollow casings 120 and 121 (FIG. 2) secured to the frame 37 for telescopically receiving extension members 122 and 123. The distal ends of these extension members 122, 123 are connected to frame assemblies 125 for supporting the stops 111 and 112. Each of the frame assemblies 125 (FIG. 6) comprises a bracket 126 secured to its associated extension member 122 and supporting an upright mounting plate 127. A pair of vertically spaced support blocks 128 and 130 are welded or otherwise fixedly secured to mounting plate 127 for supporting shafts 131 and 132 adjacent one end thereof. The other ends of the shafts 131 and 132 are similarly supported by the other frame assembly 125.

Each of the backing plates 115 of the two stops 111, 112 is provided with vertically spaced bearing blocks 133 and 135 having bearing sleeves 136 and 137 mounted on the shafts 131 and 132, respectively, and adapted to slide longitudinally therealong. A post 138 extends downwardly from structural member 116 and is provided with a pin 140 projecting into an elongated slot 141 formed in the tail portion 146 of carriage 42. Thus, as carriage 42 is moved longitudinally (to the left or right as viewed in FIG. 2), the structural member 116 and thereby stops 111 and 112 will be moved therewith by means of the pin 140 and slot 141 arrangement.

Means are provided for adjusting the disposition of stops 111 and 112, such means including elongated screws 142 (FIG. 2) threaded through nuts 145 mounted within and rigidly secured to the extension members 122 and 123. The screws 142 are journalled for rotation at their outer ends in suitable bearing 146 and engage the nuts 145 at their inner ends. An electric motor 147, mounted on the frame 37, is connected, via gear reduction mechanism 148, to an output shaft 150 having a drive sprocket 151 mounted thereon. An endless drive chain 152 is entrained about the sprocket 151 and a driven sprocket 153 mounted on one of the screws 142 for rotating the same. A drive chain 155 is trained about sprockets 156 and 157 mounted on the outer ends of screws 142 for rotating the same in unison in the same direction to adjust the stops inwardly or outwardly as dictated by the width of the particular run of windshields W being processed. The pin 140 riding in the slot 141 of carriage 42 serves as a guide in maintaining movement of the stops in a straight linear path. Suitable indicia 158 in the form of linear dimensions can be inscribed on the upper surface of the carriage tail portion 46 adjacent the slot 141 to indicate the extent of the desired adjustment.

Figure 9:
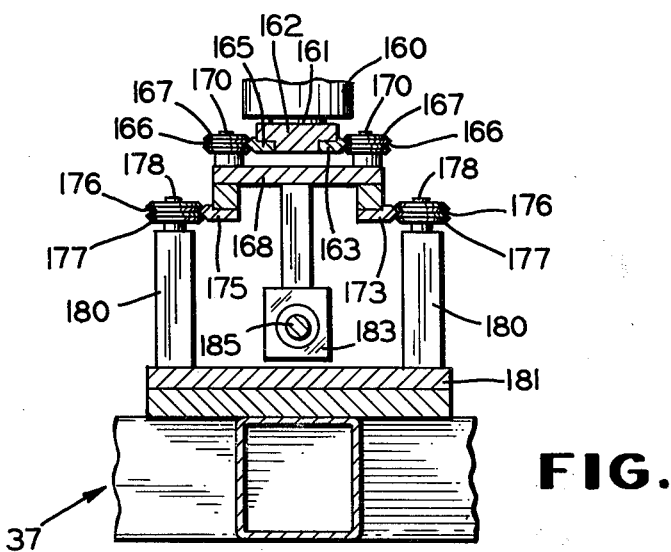
FIG. 9 is a vertical sectional view, taken along the line 9—9 of FIG. 8.

After the windshield W has been accurately aligned in a "Y" direction against stops 111 and 112, cylinder 61 becomes operative to shift the entire carriage 42 in an "X" direction (towards the left as viewed in FIG. 2). The carriage 42 carries the gripping head 87 and windshield W, as well as stops 111 and 112 therewith, until the leading end of the windshield W engages an upright stop in the form of a post 160. The stop 160 is generally cylindrical in shape and is formed of a resiliently yieldable material to avoid damage to the windshield. The stop 160 is mounted on an upright shaft 161 (FIGS. 9 and 10) secured to an upper slide member 162 having strips 163 and 165 secured to the marginal side portions thereof. These strips 163 and 165 are formed with outer dove-tailed edges slidable within complementary shaped V-shaped grooves 166 formed in guide rollers 167 spaced longitudinally along opposite sides of the slide member 162 and mounted on vertical shafts 170 affixed to a lower slide base member 168. The slide member 162 is freely slidable in a linear path relative to the lower slide base member 168, which also is mounted for linear sliding movement in the same direction.

Figure 8:
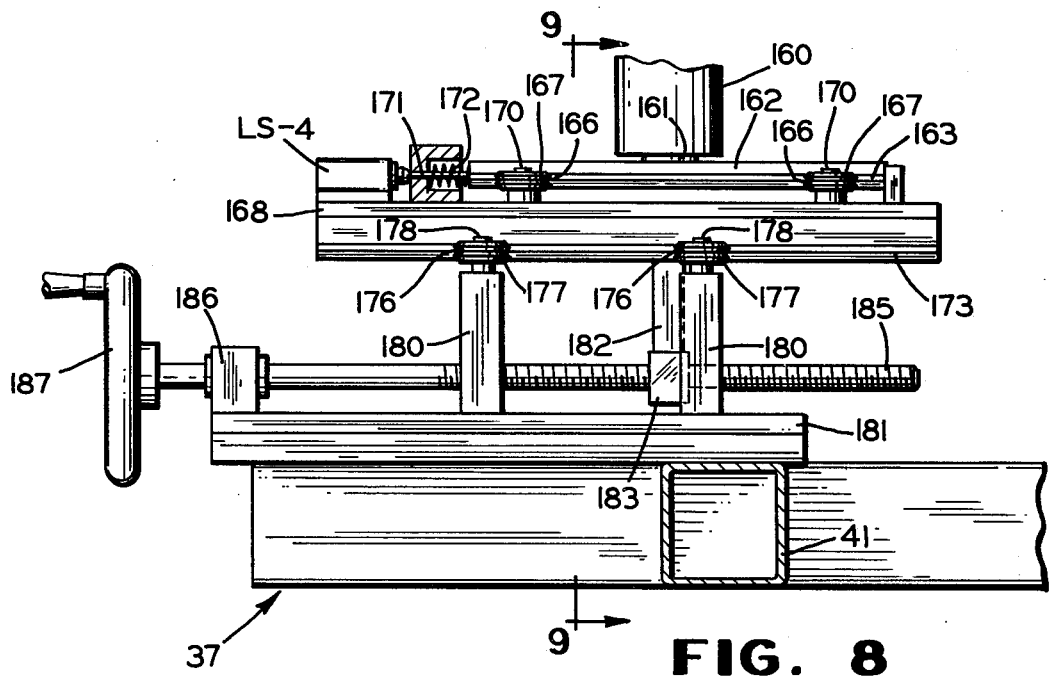
FIG. 8 is a vertical sectional view, on an enlarged scale, taken along the line 8—8 of FIG. 2.

A slight axial movement of the upper slide member 162 occasioned by engagement of the post 160 by the windshield end portion depresses the plunger 171 (FIG. 8) of a limit switch LS-4 to complete a circuit generating a signal to deactivate cylinder 61 and terminate movement of the carriage 42 and thereby windshield W in the "X" direction. The upper slide member 162 is biased, as by a spring 172, to prevent over travel of the post 160 and assure accurate alignment of the windshield relative to the pick-up head of the transfer apparatus.

The lower slide member 168 is provided with strips 173 and 175 secured to the underside and along the marginal side portions thereof. The strips 173 and 175 are formed with dove-tailed edges received within complementary V-shaped grooves 176 formed in guide rollers 177 and spaced longitudinally along the opposite sides of lower slide member 168. The rollers 167 are mounted on vertical shafts 178 secured to upstanding posts 180 mounted on a support plate 181 forming a part of the frame 37. The purpose of the lower slide member 168 is to provide for linear adjustment of stop 160, as dictated by the length of the run of windshields being processed. To this end, a structural member 182 extends downwardly from slide member 168 to support a nut 183 through which an elongated screw 185 is threaded. The screw 185 is fixed against axial movement but journalled for rotation in a suitable bearing block 186 mounted on plate 181 so that rotation of the screw effects axial movement of the lower slide member 168. A suitable handle 187 can be provided on the other end of screw 185 to facilitate rotation thereof.

The mode of operation of apparatus 20 in precisely orienting one windshield W is as follows:

A finished windshield W advancing on the conveyor system 21 is delivered onto conveyor take-off section 25. As the windshield is received on conveyor take-off section 25, the leading edge thereof trips limit switch LS-1 to produce a signal which, through a suitable electrical control system (not shown), activates a timer controlling operation of motor 35. This timer is designed to de-energize motor 35 and thereby stop conveyor belts 26 and the advancing windshield W when the latter reaches a position in general vertical registry with the underlying gripping head 87. This signal also activates a second timer controlling operation of cylinder 76 so that when the windshield stops above gripping head 87, the cylinder 76 becomes operative to lift head 87 upwardly in a "Z" direction between the conveyor belts 26 and lift the windshield W off belts 26. Even if the windshield is skewed or off-center from its desired position on the belts 26, the vacuum force applied via line 108, piston rod passage 107 and hoses 105 and 106 to the suction cups 100 and 101 positively secures the windshield W thereto, preventing shifting of the windshield relative to and/or toppling thereof from the gripping head 87. As the gripping head 87 reaches the end of its upstroke, the actuator plate 110 on piston rod 86 engages switch LS-2 to produce a signal deactivating the cylinder 76 and thereby disposing the windshield in its desired upper level.

The signal initiated by switch LS-2 also actuates cylinder 82 to move the slide 66 in a "Y" direction towards stops 111 and 112. Movement of slide 66 carries the cylinder 76 and gripping head 87 therewith to advance the windshield W against stops 111 and 112. If the windshield is somewhat skewed, one of the corners of the windshield will engage its associated stop first, causing the freely swinging mounting plate 89 to pivot (FIG. 7) and bring the other corner of the windshield into engagement with the other stop.

With the windshield thus oriented in the "Y" direction, cylinder 61 becomes operative to move the carriage 42 in an "X" direction toward stop 160. Movement of the carriage 42 carries therewith the stops 111 and 112, partially by reason of the frictional contact of the windshield with the stops, but primarily by means of the pin 140 and slot 141 arrangement. The carriage 42 continues to move until the leading edge of the windshield engages stop 160 and, via slide 162, trips limit switch LS-4 to deactivate cylinder 61. This stops carriage 42 and terminates movement of the windshield W in an "X" direction to complete final precise orientation of the windshield in its desired position in vertical registry with the overlying pick-up head of the transfer apparatus. A suitable vacuum control can be provided for terminating the suction force when the windshield is gripped for removal by the overlying pick-up head. When the vacuum is shut off, air under pressure can be directed through the cups 100,101 to facilitate release of the windshield therefrom, if desired. Once the windshield is removed from the gripping head 87, the latter is returned to its initial "home" position by sequentially reversing the direction of movement of carriage 42 in the "X" direction, slide 66 in the "Y" direction, and lowering of the gripping head 87 below the conveyor belts 26 in readiness for the next cycle of operation.

From the foregoing, it is apparent that the objects of the present invention have been fully accomplished. As a result of this invention, single windshields or any other curved or flat sheet material can be automatically positioned in a precise orientation for subsequent transfer or for any other purpose desired. By the provision of a gripping head automatically movable in three directions, repeated accurate positioning of sheet articles is assured to promote the expeditious, smooth and rigid flow of such sheet articles essential in a mass production operation.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

I claim:

1. A sheet handling apparatus comprising: a frame; a horizontally reciprocal carriage mounted on said frame and movable in a first direction; a horizontally reciprocal slide mounted on said carriage for movement in a second direction normal to said first direction; means on said slide for supporting a sheet article, said supporting means including a gripping head mounted for free pivotal movement about a vertical axis and having a vacuum means thereon for bodily supporting the sheet article in a horizontal orientation, and means for lifting said gripping head from a lower sheet article receiving position to a generally horizontal plane above the sheet receiving position; first and second right angularly related stop means mounted on said frame; and means sequentially moving said slide and said carriage to urge the sheet article against said first and second stop means, respectively, to align the sheet article in a precise position.

2. Apparatus according to claim 1, wherein said vacuum means include a pair of spaced suction cups connected to a source of vacuum.

3. Apparatus according to claim 1, wherein said first stop means comprises a pair of longitudinally spaced upright plates, and means connecting said plates together for movement along with said carriage.

4. Apparatus according to claim 3, wherein each of said upright plates is provided with a layer of resiliently yieldable material rigidly secured thereto.

5. Apparatus according to claim 3, including means for selectively adjusting said upright plates in unison transversely toward and away from said sheet article supporting means.

6. Apparatus according to claim 1, wherein said second stop means comprises an upstanding post mounted on said frame for slight horizontal movement in said second direction.

7. Apparatus according to claim 6, including means for selectively adjusting said upstanding post longitudinally toward and away from said sheet article supporting means.

8. Apparatus according to claim 6, wherein said post is generally cylindrical in shape and formed of a resiliently yieldable material mounted on an upstanding shaft.

9. Apparatus according to claim 8, including a slide mounted on said frame, means mounting said shaft on said slide, and means biasing said slide in a predetermined position against movement incurred by movement of said sheet article against said post.

* * * * *